US012689871B2

(12) United States Patent
Hong et al.

(10) Patent No.: US 12,689,871 B2
(45) Date of Patent: Jul. 21, 2026

(54) POLICY COORDINATION METHOD FOR GROUP OF USER EQUIPMENT AND COMMUNICATION DEVICE

(71) Applicant: Beijing Xiaomi Mobile Software Co., Ltd., Beijing (CN)

(72) Inventors: Wei Hong, Beijing (CN); Xiaowei Jiang, Beijing (CN); Lei Yu, Beijing (CN); Dong Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 282 days.

(21) Appl. No.: 18/553,436

(22) PCT Filed: Mar. 30, 2021

(86) PCT No.: PCT/CN2021/084146
§ 371 (c)(1),
(2) Date: Sep. 29, 2023

(87) PCT Pub. No.: WO2022/205007
PCT Pub. Date: Oct. 6, 2022

(65) Prior Publication Data
US 2024/0365088 A1 Oct. 31, 2024

(51) Int. Cl.
*H04W 4/06* (2009.01)
*H04W 8/18* (2009.01)

(52) U.S. Cl.
CPC .............. *H04W 4/06* (2013.01); *H04W 8/18* (2013.01)

(58) Field of Classification Search
CPC .................................. H04W 4/06; H04W 8/18

USPC ......................................................... 455/418
See application file for complete search history.

(56) References Cited

U.S. PATENT DOCUMENTS

2020/0059761 A1 2/2020 Li et al.
2020/0196130 A1* 6/2020 Tamura ................... H04W 8/02

FOREIGN PATENT DOCUMENTS

| CN | 101072170 A | 11/2007 |
|----|-------------|---------|
| CN | 102014343 A | 4/2011 |
| CN | 102369701 A | 3/2012 |
| CN | 105939357 A | 9/2016 |
| CN | 110049485 A | 7/2019 |
| CN | 110506439 A | 11/2019 |
| CN | 110830935 A | 2/2020 |
| CN | 110996303 A | 4/2020 |

(Continued)

OTHER PUBLICATIONS

Huawei, et al., "PCF Discovery and Selection", SA WG2 Meeting #122, S2-174481. Jun. 2017, 3 pages.

(Continued)

*Primary Examiner* — Jirapon Tulop
(74) *Attorney, Agent, or Firm* — Oblon, McClelland, Maier & Neustadt, L.L.P.

(57) ABSTRACT

The present disclosure provide a policy coordination method for a group of user equipment (UEs), the method includes receiving a policy request, where the policy request is related to a group policy for the group of UEs; and performing, according to the policy request and pre-stored group policy information, policy coordination on the group of UEs, where the pre-stored group policy information indicates a policy required to be adopted by each UE in the group of UEs for various group policies of the group of UEs.

16 Claims, 7 Drawing Sheets

(56)          References Cited

FOREIGN PATENT DOCUMENTS

| | | | | |
|---|---|---|---|---|
| CN | 111132238 A | 5/2020 | | |
| CN | 111226465 A | 6/2020 | | |
| CN | 112136294 A | 12/2020 | | |
| CN | 112312539 A | 2/2021 | | |
| WO | WO-2011134154 A1 * | 11/2011 | ......... | H04L 41/0894 |

OTHER PUBLICATIONS

ZTE et al., "removal of UE Policy from AM Policy Association Management section," TSG-CT WG3 Meeting #98Bis, C3-186209, Oct. 2018, 13 pages.

LG Electronics et al., "Clarification on UE Policy Association," 3GPP TSG-WG SA2 Meeting #136, S2-1911456, Nov. 2019, 5 pages.

Ericsson et al., "Applying UE Policy Association Modification to all affected UEs," 3GPP TSG-CT WG3 Meeting #108-e. C3-201253, Feb. 2020, 3 pages.

Combined Chinese Office Action and Search Report issued Jan. 17, 2025 in Chinese Patent Application No. 202180000742.2 (with English translation), 18 pages.

International Search Report Issued Dec. 29, 2021, in PCT/CN2021/084146, filed on Mar. 30, 2021, 2 pages.

Nokia et al. "KI 1: Update to Solution #13", Nokia, Nokia Shanghai Bell, SA WG2 Meeting #14le, S2-2006937 r05, Oct. 12, 2020, 8 pages.

3GPP TS 23.501 V18.3.0 (Sep. 2023); 3rd Generation Partnership Project; Technical Specification Group Services and System Aspects; System architecture for the 5G System (5GS); Stage 2 (Release 18), 686 pages.

3GPP TS 23.502 V18.3.0 (Sep. 2023); 3rd Generation Partnership Project; Technical Specification Group Services and System Aspects; Procedures for the 5G System (5GS); Stage 2 (Release 18), 889 pages.

3GPP TS 23.503 V18.3.0 (Sep. 2023); 3rd Generation Partnership Project; Technical Specification Group Services and System Aspects; Policy and charging control framework for the 5G System (5GS); Stage 2 (Release 18) 176 pages.

3GPP TSG-SA Meeting #90e New SID: Study on supporting tactile and multi-modality communication services (from S1-204384), SA 1, SP-201039, 3 pages.

* cited by examiner (a) service request carrying group policy information (b) service request carrying group policy information (c) service request carrying group policy information and a policy synchronization indication

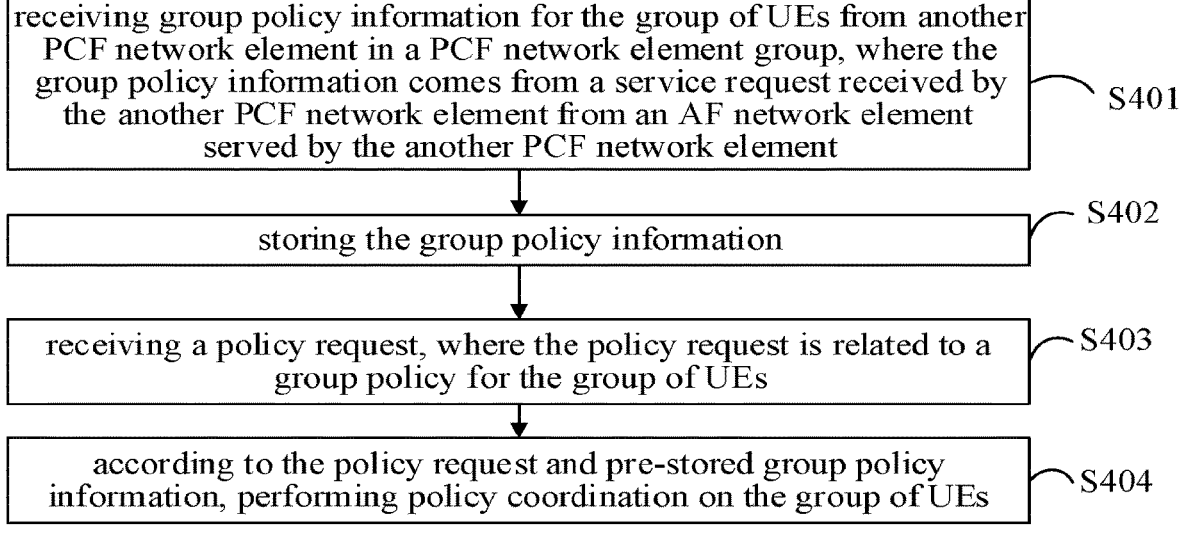

receiving group policy information for the group of UEs from another PCF network element in a PCF network element group, where the group policy information comes from a service request received by the another PCF network element from an AF network element served by the another PCF network element          S401 storing the group policy information          S402 receiving a policy request, where the policy request is related to a group policy for the group of UEs          S403 according to the policy request and pre-stored group policy information, performing policy coordination on the group of UEs          S404

FIG. 4

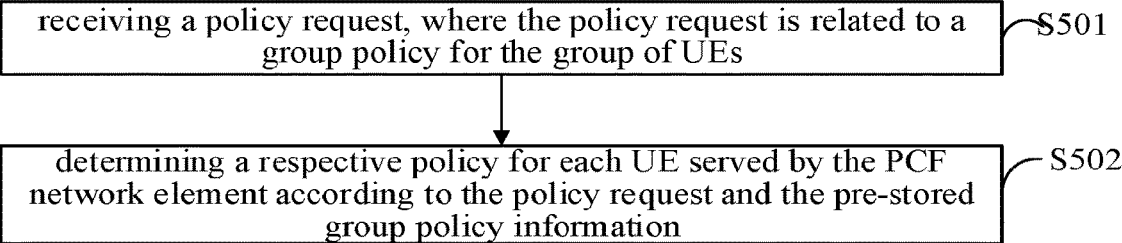

receiving a policy request, where the policy request is related to a group policy for the group of UEs          S501 determining a respective policy for each UE served by the PCF network element according to the policy request and the pre-stored group policy information          S502

FIG. 5

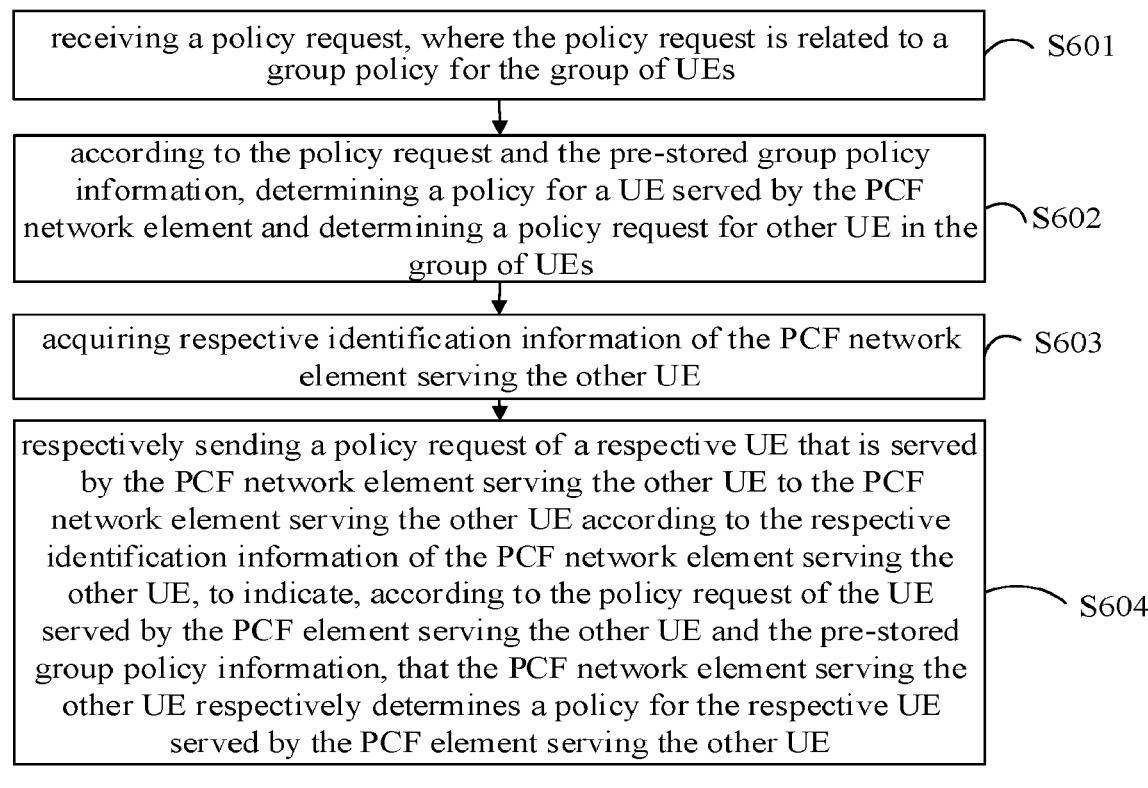

| | |
|---|---|
| receiving a policy request, where the policy request is related to a group policy for the group of UEs | S601 |
| according to the policy request and the pre-stored group policy information, determining a policy for a UE served by the PCF network element and determining a policy request for other UE in the group of UEs | S602 |
| acquiring respective identification information of the PCF network element serving the other UE | S603 |
| respectively sending a policy request of a respective UE that is served by the PCF network element serving the other UE to the PCF network element serving the other UE according to the respective identification information of the PCF network element serving the other UE, to indicate, according to the policy request of the UE served by the PCF element serving the other UE and the pre-stored group policy information, that the PCF network element serving the other UE respectively determines a policy for the respective UE served by the PCF element serving the other UE | S604 |

FIG. 6

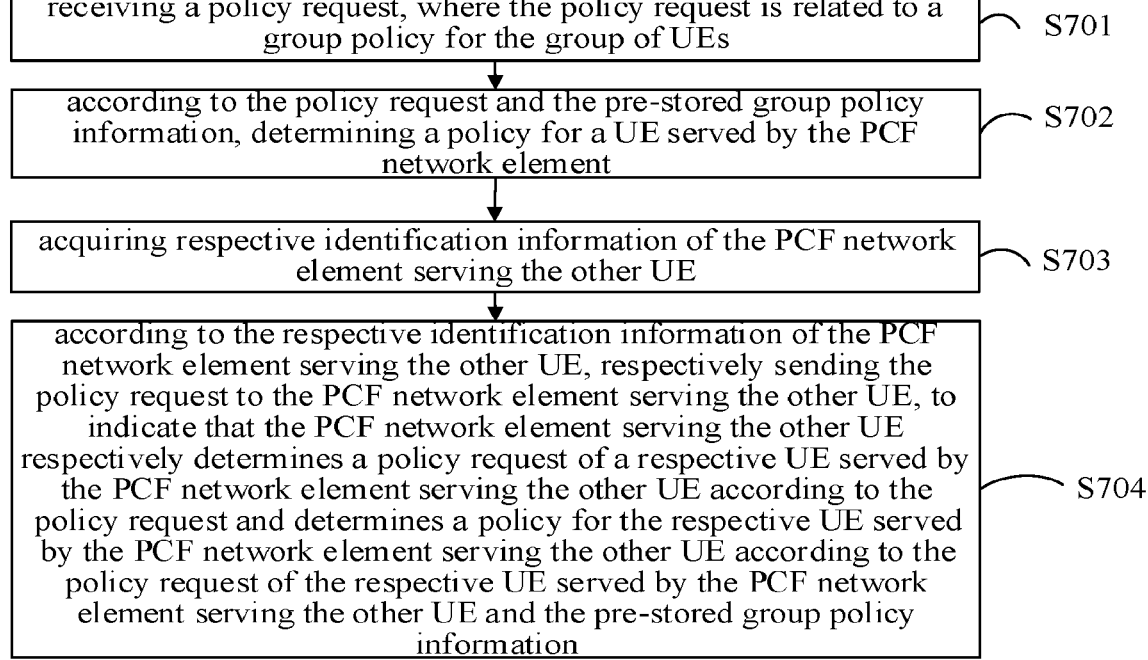

| | |
|---|---|
| receiving a policy request, where the policy request is related to a group policy for the group of UEs | S701 |
| according to the policy request and the pre-stored group policy information, determining a policy for a UE served by the PCF network element | S702 |
| acquiring respective identification information of the PCF network element serving the other UE | S703 |
| according to the respective identification information of the PCF network element serving the other UE, respectively sending the policy request to the PCF network element serving the other UE, to indicate that the PCF network element serving the other UE respectively determines a policy request of a respective UE served by the PCF network element serving the other UE according to the policy request and determines a policy for the respective UE served by the PCF network element serving the other UE according to the policy request of the respective UE served by the PCF network element serving the other UE and the pre-stored group policy information | S704 |

FIG. 7 sending a policy request to a policy control function PCF network element serving the AF network element, where the policy request is related to a group policy for the group of UEs and indicates the PCF network element to perform policy coordination on the group of UEs according to the policy request and pre-stored group policy information ⌐S801

FIG. 8 sending a service request for the group of UEs to the PCF network element serving the AF network element, where the service request includes group policy information for the group of UEs, such that the PCF network element stores the group policy information ⌐S901 sending a policy request to a PCF network element serving the AF network element, where the policy request is related to a group policy for the group of UEs and indicates the PCF network element to perform policy coordination on the group of UEs according to the policy request and pre-stored group policy information ⌐S902

FIG. 9 sending a service request for the group of UEs to each PCF network element in a PCF network element group for serving the group of UEs, where the service request includes group policy information for the group of UEs, such that each PCF network element stores the group policy information respectively ⌐S1001 sending a policy request to a PCF network element serving the AF network element, where the policy request is related to a group policy for the group of UEs and indicates the PCF network element to perform policy coordination on the group of UEs according to the policy request and pre-stored group policy information ⌐S1002

FIG. 10

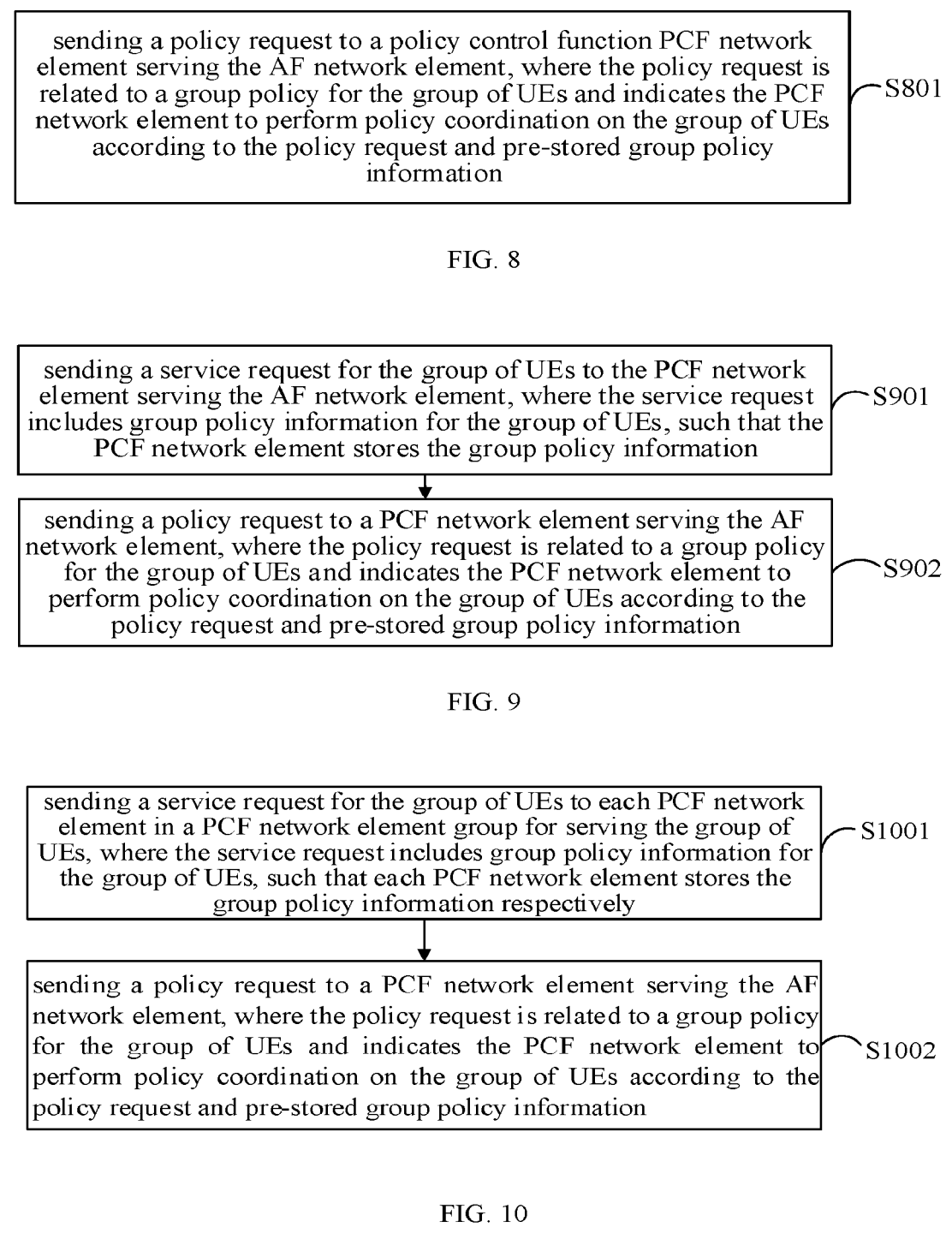

POLICY COORDINATION METHOD FOR GROUP OF USER EQUIPMENT AND COMMUNICATION DEVICE

CROSS-REFERENCE TO RELATED APPLICATIONS

The present application is a U.S. National Stage of International Application No. PCT/CN2021/084146, filed on Mar. 30, 2021, the entire content of which is incorporated herein by reference for all purposes.

TECHNICAL FIELD

The present disclosure relates to a field of mobile communication technology, and more particularly, to a policy coordination method and a policy coordination apparatus for a group of user equipment (UEs).

DESCRIPTION OF THE RELATED ART

In a current network system, there is a scenario where a group of user equipment (UEs) collaborates to perform actions or applications. In this case, a policy requirement for each UE in UEs of the group is adjusted along with a policy change of another UE in the UEs of the group, thereby ensuring a policy corresponding to each UE in the UEs of the group to be coordinated and consistent.

SUMMARY OF THE INVENTION

The present disclosure discloses a policy coordination method and a policy coordination apparatus for a group of user equipment (UEs), which may perform policy coordination on the group of UEs, so as to ensure a policy corresponding to each UE in the group of UEs to be coordinated and consistent.

The embodiments according to a first aspect of the present disclosure provide a policy coordination method for a group of user equipment UEs, applied to a policy control function (PCF) network element, the method includes: receiving a policy request, where the policy request is related to a group policy for the group of UEs; and performing, according to the policy request and pre-stored group policy information, policy coordination on the group of UEs, where the pre-stored group policy information indicates a policy required to be adopted by each UE in the group of UEs for various group policies of the group of UEs.

The embodiments according to a second aspect of the present disclosure provide a policy coordination method for a group of user equipment UEs, applied to an application function (AF) network element, the method includes: sending a policy request to a policy control function PCF network element serving the AF network element, where the policy request is related to a group policy for the group of UEs and indicates the PCF network element to perform policy coordination on the group of UEs according to the policy request and pre-stored group policy information, where the pre-stored group policy information indicates a policy required to be adopted by each UE in the group of UEs for various group policies of the group of UEs.

The embodiments according to a third aspect of the present disclosure provide a communication device, including: a transceiver; a memory; a processor, connected to the transceiver and the memory respectively, configured to execute computer-executable instructions stored on the memory, such that the policy coordination method for a group of user equipment UEs according to any one of the above embodiments of the first aspect and the second aspect is implemented.

Additional aspects and advantages of the embodiments of the present disclosure will be set forth in part in the following description, which will become apparent from the following description, or may be learned by practice of the present disclosure.

BRIEF DESCRIPTION OF THE DRAWINGS

The above and/or additional aspects and advantages of the present disclosure will become apparent and easy to understand from the following description of embodiments in conjunction with the accompanying drawings, in which:

FIG. 4 is a flowchart of a policy coordination method for a group of UEs according to an embodiment of the present disclosure;

FIG. 5 is a flowchart of a policy coordination method for a group of UEs according to an embodiment of the present disclosure;

FIG. 6 is a flowchart of a policy coordination method for a group of UEs according to an embodiment of the present disclosure;

FIG. 7 is a flowchart of a policy coordination method for a group of UEs according to an embodiment of the present disclosure;

FIG. 8 is a flowchart of a policy coordination method for a group of UEs according to an embodiment of the present disclosure;

FIG. 9 is a flowchart of a policy coordination method for a group of UEs according to an embodiment of the present disclosure;

FIG. 10 is a flowchart of a policy coordination method for a group of UEs according to an embodiment of the present disclosure;

DETAILED DESCRIPTION OF THE PREFERRED EMBODIMENTS

Figure 1:
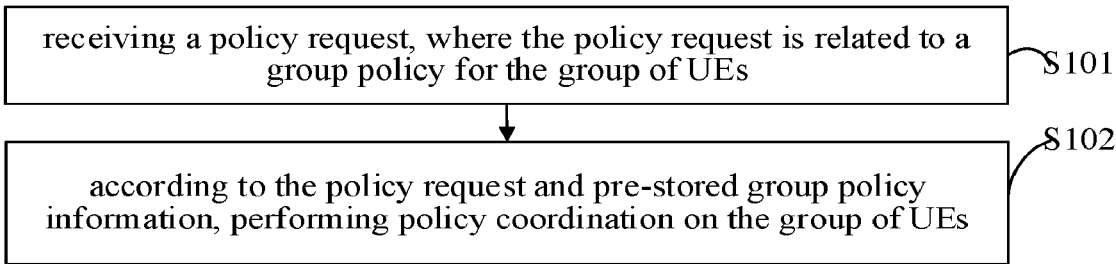
FIG. 1 is a flowchart of a policy coordination method for a group of UEs according to an embodiment of the present disclosure.

Embodiments of the present disclosure are described in detail below, examples of which are illustrated in the accompanying drawings, and the same or similar reference numerals denote the same or similar elements or elements having the same or similar functions throughout the drawings. The embodiments described below with reference to the accompanying drawings are exemplary, which are merely used to explain the present disclosure, and should not be construed as a limitation of the present disclosure.

In a current technical field of mobile communication, there is a scenario where a group of UEs collaborates to perform actions or applications. In this case, if a policy corresponding to an application function (AF) session of a certain UE in the group of UEs changes, a policy corresponding to an AF session of other UE in the group of UEs also needs to be adjusted accordingly, so as to ensure synchronization among the AF sessions of the UEs.

To this end, the present disclosure provides a policy coordination method and a policy coordination apparatus for a group of user equipment (UEs), which may perform policy coordination on the group of UEs, such that the policy corresponding to the AF session of each UE in the group of UEs is consistent.

FIG. 1 shows a policy coordination method for a group of UEs according to an embodiment of the present disclosure, applied to a policy control function (PCF) network element, where one or a plurality of PCF network elements may be used to serve the group of UEs. For example, all UEs in the group of UEs may be served by one PCF network element, or each UE in the group of UEs may be served by different PCF network elements. As shown in FIG. 1, in the present embodiment, the policy coordination method for the group of UEs includes the following steps S101 and S102.

in S101, a policy request is received, where the policy request is related to a group policy for the group of UEs.

For a certain UE in the group of UEs, when the policy required for an AF session of the UE changes, an AF network element corresponding to the UE may send information carrying a policy request to the PCF network element serving the UE, and the policy request is related to the group policy. For example, the policy request may be a quality of service (QoS) policy request related to a quality of service policy of the group of UEs. The PCF network element may receive this policy request from the AF network element.

In some embodiments, the policy request may be received from the AF network element served by the PCF network element or from another PCF network element (if present) other than the PCF network element in a PCF network element group for serving the group of UEs.

In S102, according to the policy request and pre-stored group policy information, policy coordination is performed on the group of UEs.

Group policy information is pre-stored in the PCF network element. For example, the group policy information may have the following table format:

TABLE 1

| Group Policy Information for a Group of UEs | | | | |
| --- | --- | --- | --- | --- |
| | UE1 | UE2 | . . . | UEn |
| policy 1 | P11 | P12 | . . . | P1n |
| policy 2 | P21 | P22 | . . . | P2n |
| . . . | | | | |
| policy m | Pm1 | Pm2 | . . . | Pmn |

As shown in the above table, a group of UEs includes a total of n UEs from UE1 to UEn, and a group policy involved in the group of UEs includes a total of m policies from policy 1 to policy m, for example, the group policy may be a QoS policy. A policy that each UE should adopt for each group policy is recorded in the group policy information. Since the group of UEs collaborates to complete actions, each UE in the group of UEs needs to adopt a coordinated and consistent policy for each group policy as recorded in the group policy information. For example, for the group policy being a policy 1, a corresponding policy adopted by UE1 is P11, a corresponding policy adopted by UE2 is P12 . . . , a corresponding policy adopted by UEn is P1n. Of course, it should be understood that the group policy information may have other formats, as long as the corresponding policy that each UE should adopt may be recorded.

Since the above group policy information is pre-stored in the PCF network element, after receiving the policy request, the PCF network element may perform the policy coordination on the group of UEs according to the policy request and the pre-stored group policy information.

In the embodiment of the present disclosure, the group policy information is pre-stored in the PCF network element serving the group of UEs, such that when the PCF network element receives the policy request, the PCF network element may perform the policy coordination on the group of UEs according to the policy request and the pre-stored group policy information, thereby ensuring policy synchronization among the AF sessions of the UEs.

Figure 2:
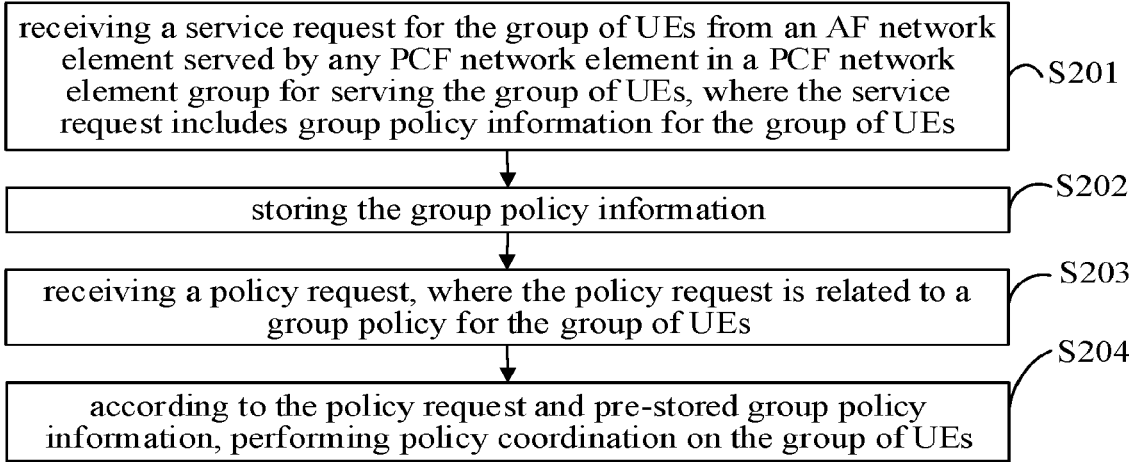
FIG. 2 is a flowchart of a policy coordination method for a group of UEs according to an embodiment of the present disclosure.

FIG. 2 shows a policy coordination method for a group of UEs according to an embodiment of the present disclosure, applied to a PCF network element, and the PCF network element is one PCF network element in a PCF network element group for serving the group of UEs. On the basis of the embodiment shown in FIG. 1, the present embodiment shows how to acquire and store group policy information. As shown in FIG. 2, the policy coordination method for the group of UEs includes the following steps S201 to S204.

In S201, a service request for the group of UEs is received from an AF network element served by any PCF network element in a PCF network element group for serving the group of UEs, where the service request includes group policy information for the group of UEs.

The UEs in the group of UEs may be served by a PCF network element group that includes a plurality of PCF network elements. For a certain UE in the group of UEs, when a certain service needs to be initiated, the AF network element corresponding to the UE may send a service request to any PCF network element in the PCF network element group serving the group of UEs. Thus, the certain PCF network element in the PCF network element group may receive the service request from the AF network element corresponding to any PCF network element in the PCF network element group. The service request includes group policy information for the group of UEs.

Figure 3:
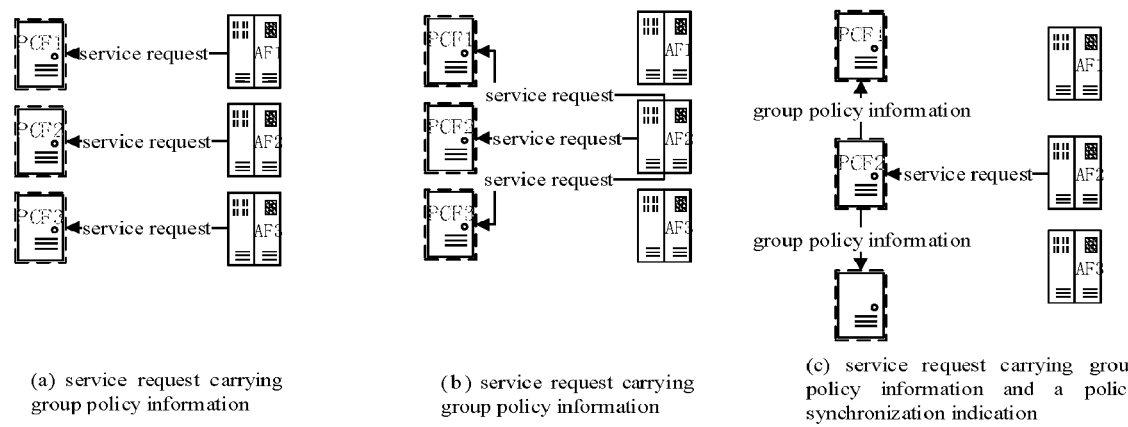
FIG. 3 shows a manner in which an AF network element provides group policy information to a PCF network element.

FIG. 3 shows a manner in which a PCF network element acquires group policy information from an AF network element. As shown in FIG. 3, assuming that the PCF network element group serving the group of UEs includes three PCF network elements, and each PCF network element corresponds to one AF network element.

In a manner 1, each PCF network element in the PCF network element group receives a service request carrying group policy information from a respective AF network element it serves. For example, as shown in FIG. 3 (a), a first PCF network element PCF1 receives a service request from an AF network element AF1 it serves, a second PCF network element PCF2 receives a service request from an AF network element AF2 it serves and the third PCF network element PCF3 receives a service request from an AF network element AF3 it serves.

In a manner 2, all PCF network elements in the PCF network element group receive a service request carrying group policy information from the same AF network element. For example, as shown in FIG. 3 (b), a first PCF network element PCF1, a second PCF network element PCF2, and a third PCF network element PCF3 all receive the service request from an AF network element AF2. Of course, although not shown in FIG. 3, it should be understood that the first PCF network element PCF1, the second PCF network element PCF2, and the third PCF network element PCF3 may also receive the service request from an AF network element AF1 or from an AF network element AF3.

In a manner 3, a certain PCF network element in the PCF network element group receives a service request carrying group policy information and a policy synchronization indication from an AF network element it serves. For example, as shown in FIG. 3 (c), a second PCF network element PCF2 receives a service request from an AF network element it serves, the service request not only includes group policy information but also includes a policy synchronization indication, and the policy synchronization indication is used to indicate the PCF network element to distribute the group policy information from the received service request to other PCF network element(s) in the PCF network element group.

In the case of the manner 3, in some embodiments, the policy coordination method for the group of UEs also includes: acquiring respective identification information of other PCF network element in the PCF network element group; according to the respective identification information of the other PCF network element, the group policy information is respectively sent to the other PCF network element, such that the other PCF network element stores the group policy information respectively.

As shown in FIG. 3 (c), when the second PCF network element PCF2 receives the service request including the group policy information and the policy synchronization indication from the AF network element it serves, the second PCF network element PCF2 acquires the respective identification information of the other PCF network elements, i.e., the first PCF network element PCF1 and the third PCF network element PCF3, in the PCF network element group. Specifically, for example, the PCF2 may acquire identification information of the other PCF network elements in the PCF network element group for serving the group of UEs by querying a binding support function (BSF) network element. Then, the second PCF network element PCF2 may respectively send the group policy information to the first PCF network element PCF1 and the third PCF network element PCF3 according to the acquired identification information of the first PCF network element PCF1 and the acquired identification information of the third PCF network element PCF3.

In S202, the group policy information is stored.

After receiving the service request that includes the group policy information, the PCF network element may store the group policy information for later use.

In S203, a policy request is received, where the policy request is related to a group policy for the group of UEs.

In S204, according to the policy request and pre-stored group policy information, policy coordination is performed on the group of UEs.

For the specific details of the above steps S203 to S204, please refer to the relevant description of the S101 to S102 shown in FIG. 1, which will not be repeated herein.

In an embodiment of the present disclosure, the PCF network element may acquire the group policy information from the AF network element corresponding to any PCF network element in the PCF network element group that serves the group of UEs and store the group policy information. Thus, when any PCF network element in the PCF network element group receives the policy request, the policy coordination may be performed on the group of UEs according to the policy request and the stored group policy information, thereby ensuring policy synchronization among the AF sessions of the UEs.

FIG. 4 shows a policy coordination method for a group of UEs according to an embodiment of the present disclosure, applied to a PCF network element, and the PCF network element is one PCF network element in a PCF network element group for serving the group of UEs. On the basis of the embodiment shown in FIG. 1, the present embodiment shows how to acquire and store group policy information. As shown in FIG. 4, the policy coordination method for the group of UEs includes the following steps S401 to S404.

In S401, group policy information for the group of UEs is received from another PCF network element in a PCF network element group, where the group policy information comes from a service request received by the another PCF network element from an AF network element served by the another PCF network element.

The UEs in the group of UEs may be served by a PCF network element group that includes a plurality of PCF network elements. A certain PCF network element in the PCF network element group serving the group of UEs may receive group policy information for the group of UEs from other PCF network element in the PCF network element group, and the other PCF network element acquires the group policy information from the service request received by the AF network element it serves.

Referring again to FIG. 3 (c), as stated above, in the manner 3, the first PCF network element PCF1 and the third PCF network element PCF3 respectively receive the group policy information from the second PCF network element PCF2, while the second PCF network element PCF2 receives the service request from the AF network element it serves. The service request not only includes group policy information, but also includes a policy synchronization indication, and the policy synchronization indication is used to indicate the PCF network element to distribute the group policy information from the received service request to other PCF network element(s) in the PCF network element group.

In S402, the group policy information is stored.

After receiving the service request that includes the group policy information, the PCF network element may store the group policy information for later use.

In S403, a policy request is received, where the policy request is related to a group policy for the group of UEs.

In S404, according to the policy request and pre-stored group policy information, policy coordination is performed on the group of UEs.

For the specific details of the above steps S403 to S404, please refer to the relevant description of the S101 to S102 shown in FIG. 1, which will not be repeated herein.

In an embodiment of the present disclosure, the PCF network element may acquire the group policy information from the other PCF network element in the PCF network element group serving the group of UEs and store the group policy information. Thus, when any PCF network element in the PCF network element group receives the policy request, the policy coordination may be performed on the group of UEs according to the policy request and the stored group policy information, thereby ensuring policy synchronization among the AF sessions of the UEs.

FIG. 5 shows a policy coordination method for a group of UEs according to an embodiment of the present disclosure, applied to a PCF network element, and the PCF network element is one PCF network element in a PCF network element group for serving the group of UEs. On the basis of the embodiment shown in FIG. 1, the present embodiment shows how to perform policy coordination on the group of UEs according to a policy request and group policy information. As shown in FIG. 5, in the present embodiment, the PCF network element group only includes the PCF network element, i.e. the PCF network element is used for serving all UEs in the group of UEs, and the policy coordination method for the group of UEs includes the following steps S501 and S502.

In S501, a policy request is received, where the policy request is related to a group policy for the group of UEs.

For the specific details of the above step S501, please refer to the relevant description of S101 shown in FIG. 1, which will not be repeated herein.

In S502, a respective policy is determined for each UE served by the PCF network element according to the policy request and the pre-stored group policy information.

In a case where the PCF network element serves all UEs in the group of UEs, after receiving the policy request, the PCF network element may determine the respective policy for each UE in the group of UEs according to the policy request and the pre-stored group policy information.

For example, according to the group policy information shown in Table 1, if the PCF network element receives a policy request involving the policy 1, the PCF network element may determine a policy for UE1 in the group of UEs as P11, determine a policy for UE2 as P12 . . . and determine a policy for UEn as P1n.

In an embodiment of the present disclosure, all UEs in the group of UEs are serviced by the same PCF network element. When the PCF network element receives the policy request, the PCF network element may determine the respective policy for each UE served by the PCF network element in the group of UEs according to the policy request and the pre-stored group policy information, thereby ensuring policy synchronization among the AF sessions of the UEs.

FIG. 6 shows a policy coordination method for a group of UEs according to an embodiment of the present disclosure, applied to a PCF network element, and the PCF network element is one PCF network element in a PCF network element group for serving the group of UEs. On the basis of the embodiment shown in FIG. 1, the present embodiment shows how to perform policy coordination on the group of UEs according to a policy request and group policy information. As shown in FIG. 6, in the present embodiment, the PCF network element group includes other PCF network element other than the PCF network element, and the policy coordination method for the group of UEs includes the following steps S601 to S604.

In S601, a policy request is received, where the policy request is related to a group policy for the group of UEs. For the specific details of the above step S601, please refer to the relevant description of S101 shown in FIG. 1, which will not be repeated herein.

In S602, according to the policy request and the pre-stored group policy information, a policy is determined for a UE served by the PCF network element and a policy request is determined for other UE in the group of UEs, where the other UE refer to other UE other than the UE served by the PCF network element in the group of UEs, and that is, the other UE is served by other PCF network element in the PCF network element group other than the PCF network element.

The UEs in the group of UEs may be served by a PCF network element group that includes a plurality of PCF network elements. In a case where the PCF network element serves a certain UE in the group of UEs, after receiving a policy request, the PCF network element may determine a policy for the UE and determine a policy request for other UEs in the group of UEs according to the policy request and the pre-stored group policy information.

For example, according to the group policy information shown in Table 1, if a group policy involved in the policy request received by the PCF network element that serves UE1 is policy 1, the PCF network element may determine a policy for UE1 as P11, and determine policy requests for UE2 to UEn.

In S603, respective identification information of the PCF network element serving the other UE is acquired. Specifically, for example, the PCF network element may acquire identification information of the PCF network element for serving the other UE in the group of UEs by querying a BSF network element.

In S604, a policy request of a respective UE that is served by the PCF network element serving the other UE is respectively sent to the PCF network element serving the other UE according to the respective identification information of the PCF network element serving the other UE, to indicate, according to the policy request of the UE served by the PCF element serving the other UE and the pre-stored group policy information, that the PCF network element serving the other UE respectively determines a policy for the respective UE served by the PCF element serving the other UE.

After acquiring the respective identification information of the other PCF network element serving the other UE, the PCF network element may respectively send the policy request determined for the respective UE that is served by the other PCF network element to the other PCF network element, and the other PCF network element may determine the policy for the respective UE served by the other PCF element according to the received policy request of the respective UE served by the other PCF element and the pre-stored group policy information.

In an embodiment of the present disclosure, the PCF network element group serving the group of UEs includes a plurality of PCF network elements. When one of the PCF network elements receives the policy request, the PCF network element may determine a policy for the UE it serves and determine a policy request for the other UE in the group of UEs according to the policy request and the pre-stored group policy information, and the PCF network element respectively sends the policy request of the respective UE served by the other PCF network element to the other PCF network element, such that the other PCF network element may determine the policy for the UE it serves according to the received policy request and the pre-stored group policy information, thereby ensuring policy synchronization among the AF sessions of the UEs.

FIG. 7 shows a policy coordination method for a group of UEs according to an embodiment of the present disclosure, applied to a PCF network element, and the PCF network element is one PCF network element in a PCF network element group for serving the group of UEs. On the basis of the embodiment shown in FIG. 1, the present embodiment shows how to perform policy coordination on the group of UEs according to a policy request and group policy information. As shown in FIG. 7, in the present embodiment, the PCF network element group includes other PCF network element other than the PCF network element, and the policy coordination method for the group of UEs includes the following steps S701 to S704.

In S701, a policy request is received, where the policy request is related to a group policy for the group of UEs. For the specific details of the above step S701, please refer to the relevant description of S101 shown in FIG. 1, which will not be repeated herein.

In S702, according to the policy request and the pre-stored group policy information, a policy is determined for a UE served by the PCF network element.

The UEs in the group of UEs may be served by a PCF network element group that includes a plurality of PCF network elements. In a case where the PCF network element serves a certain UE in the group of UEs, after receiving a policy request, the PCF network element may determine a policy for the UE according to the policy request and the pre-stored group policy information.

For example, according to the group policy information shown in Table 1, if a group policy involved in the policy request received by the PCF network element that serves UE1 is policy 1, the PCF network element may determine a policy for UE1 as P11.

In S703, respective identification information of the PCF network element serving the other UE is acquired, where the other UE refer to other UE other than the UE served by the PCF network element in the group of UEs, and that is, the other UE is served by other PCF network element in the PCF network element group other than the PCF network element. Specifically, for example, the PCF network element may acquire identification information of the other PCF network element for serving the other UE in the group of UEs by querying a BSF network element.

In S704, according to the respective identification information of the PCF network element serving the other UE, the policy request is respectively sent to the PCF network element serving the other UE, to indicate that the PCF network element serving the other UE respectively determines a policy request of a respective UE served by the PCF network element serving the other UE according to the policy request and determines a policy for the respective UE served by the PCF network element serving the other UE according to the policy request of the respective UE served by the PCF network element serving the other UE and the pre-stored group policy information.

After acquiring the respective identification information of the other PCF network element, the PCF network element may send the policy request it receives to the other PCF network element. After receiving the policy request, the other PCF network element determines the policy request of the respective UE served by the other PCF network element, such that the other PCF network element may determine a policy for the UE served by the other PCF network element according to the policy request of the respective UE served by the other PCF network element and the pre-stored group policy information.

In an embodiment of the present disclosure, the PCF network element group serving the group of UEs includes a plurality of PCF network elements. When one of the PCF network elements receives the policy request, the PCF network element may determine a policy for the UE it serves according to the policy request and the pre-stored group policy information. In addition, the PCF network element sends the received policy request to the other PCF network element, such that the other PCF network element may determine the policy request of the respective UE served by the other PCF network element according the policy request. Thus, the other PCF network element may determine the policy for the UE served by the other PCF network element according to the policy request of the respective UE served by the other PCF network element and the pre-stored group policy information, thereby ensuring policy synchronization among the AF sessions of the UEs.

FIG. 8 shows a policy coordination method for a group of UEs according to an embodiment of the present disclosure, applied to an application function (AF) network element. As shown in FIG. 8, in the present embodiment, the policy coordination method for the group of UEs includes the following step S801.

In S801, a policy request is sent to a policy control function PCF network element serving the AF network element, where the policy request is related to a group policy for the group of UEs and indicates the PCF network element to perform policy coordination on the group of UEs according to the policy request and pre-stored group policy information.

For a certain UE in the group of UEs, when the policy required for an AF session of the UE changes, an AF network element corresponding to the UE may send information carrying a policy request to the PCF network element serving the UE, and the policy request is related to the group policy. For example, the policy request may be a quality of service (QoS) policy request related to a quality of service policy of the group of UEs. The policy request may indicate the PCF network element to perform the policy coordination on the group of UEs according to the policy request and the pre-stored group policy information.

Group policy information is pre-stored in the PCF network element. For example, the group policy information may have the format shown in above Table 1.

As shown in Table 1, a group of UEs includes a total of n UEs from UE1 to UEn, and a group policy involved in the group of UEs includes a total of m policies from policy 1 to policy m, for example, the group policy may be a QoS policy. A policy that each UE should adopt for each group policy is recorded in the group policy information. Since the group of UEs collaborates to complete actions, each UE in the group of UEs needs to adopt a coordinated and consistent policy for each group policy as recorded in the group policy information. For example, for the group policy being a policy 1, a corresponding policy adopted by UE1 is P11, a corresponding policy adopted by UE2 is P12 . . . , a corresponding policy adopted by UEn is P1n. Of course, it should be understood that the group policy information may have other formats, as long as the corresponding policy that each UE should adopt may be recorded.

In an embodiment of the present disclosure, the AF network element may send a policy request to the PCF network element serving the AF network element, and there is pre-stored group policy information in the PCF network element. Thus, when receiving the policy request, the PCF network element may perform the policy coordination on the group of UEs according to the policy request and the pre-stored group policy information, thereby ensuring policy synchronization among the AF sessions of the UEs.

FIG. 9 shows a policy coordination method for a group of UEs according to an embodiment of the present disclosure, applied to an AF network element. On the basis of the embodiment shown in FIG. 8, as shown in FIG. 9, the policy coordination method for the group of UEs includes the following steps S901 and S902.

In S901, a service request for the group of UEs is sent to the PCF network element serving the AF network element, where the service request includes group policy information for the group of UEs, such that the PCF network element stores the group policy information.

For a certain UE in the group of UEs, when a certain service needs to be initiated, the AF network element corresponding to the UE may send a service request to the PCF network element serving the AF network element, and the service request includes the group policy information for the group of UEs. Thus, after receiving the service request, the PCF network element may store the group policy information for the group of UEs for later use.

Referring again to FIG. 3, FIG. 3 shows a manner in which an AF network element provide group policy information to a PCF network element. As shown in FIG. 3, assuming that the PCF network element group serving the group of UEs includes three PCF network elements, and each PCF network element corresponds to one AF network element.

In some embodiments, the AF network elements send a service request carrying group policy information to a PCF network element group serving the AF network elements. For example, as shown in FIG. 3 (a), a first AF network element AF1 sends a service request to a PCF network element PCF1 serving the first AF network element AF1, a second AF network element AF2 sends a service request to a PCF network element PCF2 serving the second AF network element AF2, and a third AF network element AF3 sends a service request to a PCF network element PCF3 serving the third AF network element AF3.

In some embodiments, the AF network element sends a service request carrying group policy information and a policy synchronization indication to the PCF network element serving the AF network element. For example, as shown in FIG. 3 (c), the second AF network element AF2 sends a service request to the PCF network element PCF2 serving the second AF network element AF2. The service request not only includes group policy information, but also includes a policy synchronization indication, and the policy synchronization indication is used to indicate that the PCF network element respectively sends the received group policy information to other PCF network element in the PCF network element group when the PCF network element group for serving the group of UEs includes the other PCF network element other than the PCF network element, such that the other PCF network element stores the group policy information respectively.

As shown in FIG. 3 (c), when the second PCF network element PCF2 receives the service request including the group policy information and the policy synchronization indication from the AF network element it serves, the second PCF network element PCF2 acquires the respective identification information of the other PCF network elements, i.e., the first PCF network element PCF1 and the third PCF network element PCF3, in the PCF network element group. Specifically, for example, the PCF2 may acquire identification information of the other PCF network elements in the PCF network element group for serving the group of UEs by querying a binding support function (BSF) network element. Then, the second PCF network element PCF2 may respectively send the group policy information to the first PCF network element PCF1 and the third PCF network element PCF3 according to the acquired identification information of the first PCF network element PCF1 and the acquired identification information of the third PCF network element PCF3.

In S902, a policy request is sent to a PCF network element serving the AF network element, where the policy request is related to a group policy for the group of UEs and indicates the PCF network element to perform policy coordination on the group of UEs according to the policy request and pre-stored group policy information.

For the specific details of the above step S902, please refer to the relevant description of the S801 shown in FIG. 1, which will not be repeated herein.

In an embodiment of the present disclosure, the AF network element may send the group policy information to the PCF network element serving the AF network element, such that the PCF network element may store the group policy information. In addition, the PCF network element may also distribute the group policy information to other PCF network element in the PCF network element group, such that the group policy information may be stored in each PCF network element in the PCF network element group serving the group of UEs.

FIG. 10 shows a policy coordination method for a group of UEs according to an embodiment of the present disclosure, applied to an AF network element. On the basis of the embodiment shown in FIG. 8, as shown in FIG. 10, the policy coordination method for the group of UEs includes the following steps S1001 and S1002.

In S1001, a service request for the group of UEs is sent to each PCF network element in a PCF network element group for serving the group of UEs, where the service request includes group policy information for the group of UEs, such that each PCF network element stores the group policy information respectively.

The UEs in the group of UEs may be served by a PCF network element group that includes a plurality of PCF network elements. For a certain UE in the group of UEs, when a certain service needs to be initiated, the AF network element corresponding to the UE may send a service request to each PCF network element in the PCF network element group serving the group of UEs, and the service request includes group policy information for the group of UEs. Thus, each PCF network element in the PCF network element group may store the group policy information for later use after receiving the service request.

Referring again to FIG. 3, FIG. 3 shows a manner in which an AF network element provide group policy information to a PCF network element. As shown in FIG. 3, assuming that the PCF network element group serving the group of UEs includes three PCF network elements, and each PCF network element corresponds to one AF network element.

In some embodiments, the AF network element sends a service request carrying group policy information to all PCF network elements in the PCF network element group. For example, as shown in FIG. 3 (b), a AF network element AF2 sends a service request to a first PCF network element PCF1, a second PCF network element PCF2, and a third PCF network element PCF3. Of course, although not shown in FIG. 3, it should be understood that the AF network element AF1 or the AF network element AF3 may send the service request to the first PCF network element PCF1, the second PCF network element PCF2, and the third PCF network element PCF3.

In S1002, a policy request is sent to a PCF network element serving the AF network element, where the policy request is related to a group policy for the group of UEs and indicates the PCF network element to perform policy coordination on the group of UEs according to the policy request and pre-stored group policy information.

For the specific details of the above step S1002, please refer to the relevant description of the S801 shown in FIG. 1, which will not be repeated herein.

In an embodiment of the present disclosure, the AF network element may send the group policy information to each PCF network element in the PCF network element group serving the group of UEs, such that each PCF network element may store the group policy information, thereby storing the group policy information in each PCF network element in the PCF network element group serving the group of UEs.

Figure 11:
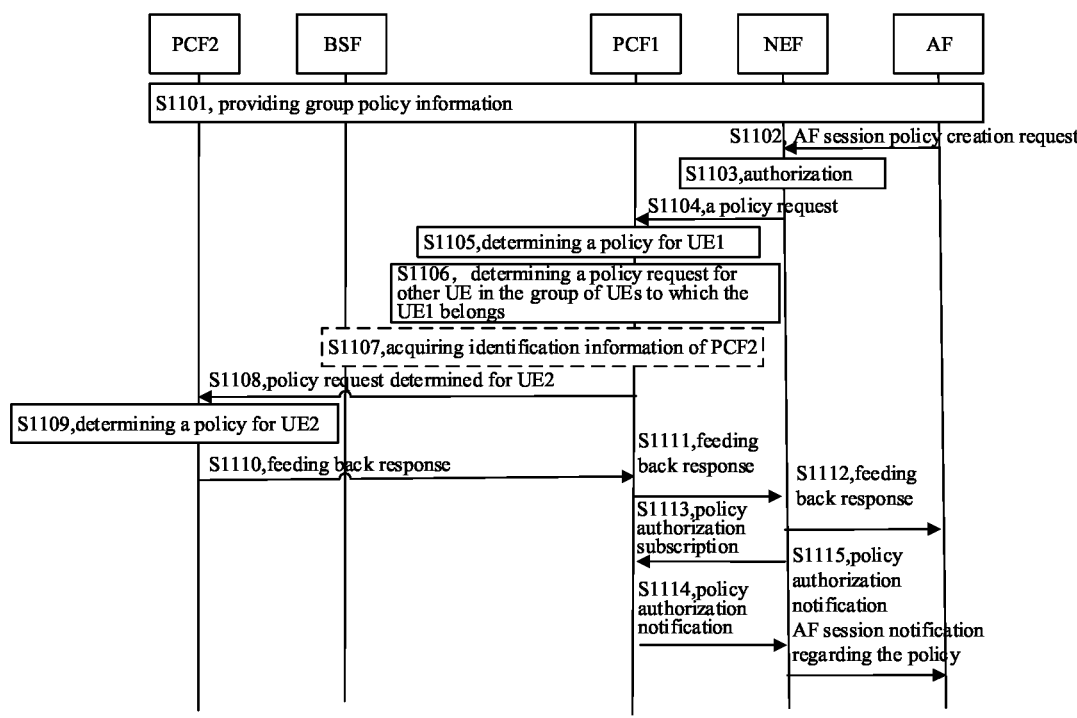
FIG. 11 is a specific implementation flowchart of a policy coordination method for a group of UEs according to an embodiment of the present disclosure.

FIG. 11 shows a specific implementation of a policy coordination method for a group of UEs according to an embodiment of the present disclosure, as shown in FIG. 11. In this specific implementation, an AF network element, a PCF network element (such as PCF1 and PCF2), a BSF network element, and a network exposure function (NEF) network element are involved. Of course, in the specific implementation, the network elements involved are only examples, and more or fewer network elements may be involved in other specific implementation applications. The specific implementation involves AF session creation, including the following steps S1101 to S1115.

In S1101, group policy information is provided for each network element involved, such that each network element stores the group policy information for later use.

In S1102, an AF network element sends an AF session policy creation request to the NEF network element. The AF session policy creation request may be an AF session creation request (Nnef_AFsessionWithQoS_Create Request) regarding a Qos policy. The AF session policy creation request may be related to a group policy of the group of UEs to which a UE1 it serves belongs.

In S1103, in response to the AF session policy creation request, a NEF network element performs an authorization operation.

In S1104, after determining an authorization for the AF session policy creation request, the NEF network element sends a policy request to a PCF network element PCF1. For example, the policy request may be a policy authorization creation request (Npcf_PolicyAuthorization_Create request).

In S1105, in response to the policy request, the PCF1 determines a policy for a UE1 served by the PCF1. For example, the PCF1 may determine a QoS policy applied for the UE1.

In S1106, in response to the policy request, the PCF1 also determines a policy request for other UE in the group of UEs to which the UE1 belongs based on the stored group policy information.

For example, the PCF1 may determine a QoS policy request for a UE2 in the group of UEs.

In S1107, the PCF1 acquires identification information of PCF2 serving a UE2. For example, the PCF1 may initiate a management discovery process (such as Nbsf_Management_ Discovery) to a BSF network element to discover the PCF2, so as to acquire the identification information of the PCF2.

In S1108, after acquiring the identification information of the PCF2, the PCF1 may send a policy request determined for the UE2 to the PCF2.

For example, the policy request may a policy authorization update request (Npcf_PolicyAuthorization_Update request), which may be a QoS policy request determined for the UE2.

In S1109, the PCF2 determines a policy for the UE2 based on the stored group policy information after receiving the policy request of the UE2.

In S1110, the PCF2 provides a feedback on response information to the PCF1 after receiving the policy request of the UE2. For example, after the PCF2 determines the policy for the UE2, the PCF2 may provide a feedback on a policy authorization update response (Npcf_PolicyAuthorization_ Update response) to the PCF1.

In S1111, the PCF1 provides a feedback on the response to the NEF network element after receiving the response information from the PCF2. For example, after the PCF1 receives the policy authorization update response (Npcf_PolicyAuthorization_Update response) from the PCF2, the PCF1 provides a feedback on a policy authorization creation response (Npcf_PolicyAuthorization_Create response) to the NEF network element.

In S1112, after receiving a response regarding a policy request, the NEF network element provides a feedback on the response to the AF network element. For example, after the NEF network element receives the policy authorization creation response (Npcf_PolicyAuthorization_Create response) from the PCF1, the NEF network element provides a feedback regarding an AF session creation response to the AF network element, which may be an AF session creation response (Nnef_AFsessionWithQoS_Create response) regarding the Qos policy.

In S1113: after receiving the response regarding the policy request from the PCF1, the NEF network element sends policy authorization subscription information to the PCF1 to acquire authorization information regarding the policy. For example, after the NEF network element receives the policy authorization creation response (Npcf_PolicyAuthoriza-tion_ Create response) from the PCF1, the NEF network element sends policy authorization subscription information (Npcf_PolicyAuthorization_Subscribe).

In S1114, the PCF1 provides a feedback on a policy authorization notification to the NEF network element. For example, after the PCF1 network element receives policy authorization subscription information (Npcf_PolicyAutho-rization_Subscribe) from the NEF network element, the PCF1 network element provides a feedback on a policy authorization notification (Npcf_PolicyAuthorization_No-tify) to the NEF network element, so as to notify the NEF network element of the authorization information regarding the policy.

In S1115, after receiving the policy authorization notifi-cation, the NEF network element provides a feedback on an AF session notification regarding the policy to the AF network element. For example, after the NEF network element receives the policy authorization notification (Npcf_PolicyAuthorization_Notify) from the PCF1, the NEF network element provides a feedback on the AF session notification regarding the policy to the AF network element, which may be an AF session notification (Nnef_Afsession-WithQoS_Notify) regarding the QoS policy.

According to the above implementation application, dur-ing the AF session creation process, the policy required for the corresponding UE may be provided based on the AF session.

Figure 12:
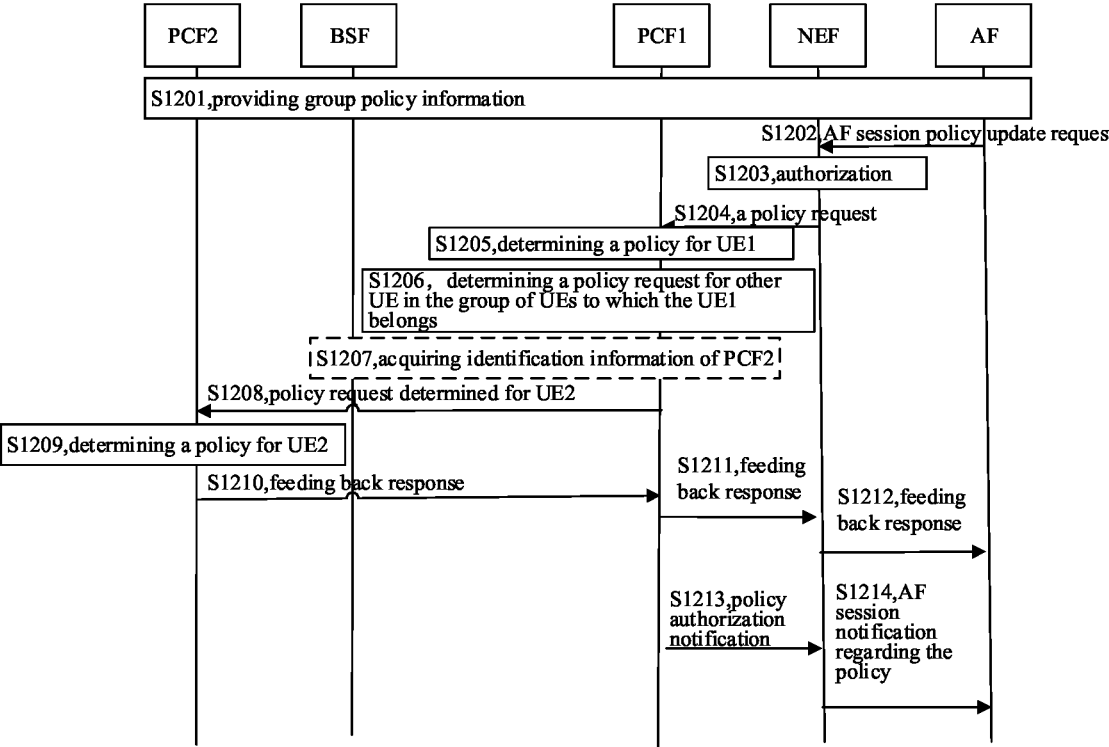
FIG. 12 is a specific implementation flowchart of a policy coordination method for a group of UEs according to an embodiment of the present disclosure.

FIG. 12 shows a specific implementation of a policy coordination method for a group of UEs according to an embodiment of the present disclosure, as shown in FIG. 12. In this specific implementation, an AF network element, a PCF network element (such as PCF1 and PCF2), a BSF network element, and a network exposure function (NEF) network element are involved. Of course, in the specific implementation, the network elements involved are only examples, and more or fewer network elements may be involved in other specific implementation applications. The specific implementation involves an AF session update, including the following steps S1201 to S1214.

In S1201, group policy information is provided for each network element involved, such that each network element stores the group policy information for later use.

In S1202, an AF network element sends an AF session policy update request to the NEF network element. The AF session policy update request may be an AF session update request (Nnef_AFsessionWithQoS_Update Request) regarding a Qos policy. The AF session policy update request may be related to a group policy of the group of UEs to which a UE1 it serves belongs.

In S1203, in response to the AF session policy update request, a NEF network element performs an authorization operation.

In S1204, after determining an authorization for the AF session policy update request, the NEF network element sends a policy request to a PCF network element PCF1. For example, the policy request may be a policy authorization update request (Npcf_PolicyAuthorization_Update request).

In S1205, in response to the policy request, the PCF1 determines a policy for a UE1 served by the PCF1. For example, the PCF1 may determine a QoS policy applied for the UE1.

In S1206, in response to the policy request, the PCF1 also determines a policy request for other UE in the group of UEs to which the UE1 belongs based on the stored group policy information. For example, the PCF1 may determine a QoS policy request for a UE2 in the group of UEs.

In S1207, the PCF1 acquires identification information of PCF2 serving a UE2. For example, the PCF1 may initiate a management discovery process (such as Nbsf_Management_ Discovery) to a BSF network element to discover the PCF2, so as to acquire the identification information of the PCF2.

In S1208, after acquiring the identification information of the PCF2, the PCF1 may send a policy request determined for the UE2 to the PCF2. For example, the policy request may a policy authorization update request (Npcf_PolicyAuthorization_Update request), which may be a QoS policy request determined for the UE2.

In S1209, the PCF2 determines a policy for the UE2 based on the stored group policy information after receiving the policy request of the UE2.

In S1210, the PCF2 provides a feedback on response information to the PCF1 after receiving the policy request of the UE2. For example, after the PCF2 determines the policy for the UE2, the PCF2 may provide a feedback on a policy authorization update response (Npcf_PolicyAuthorization_ Update response) to the PCF1.

In S1211, the PCF1 provides a feedback on the response to the NEF network element after receiving the response information from the PCF2. For example, after the PCF1 receives the policy authorization update response (Npcf_PolicyAuthorization_Update response) from the PCF2, the PCF1 provides it to the NEF network element.

In S1212, after receiving a response regarding a policy request, the NEF network element provides a feedback on the response to the AF network element. For example, after the NEF network element receives the policy authorization update response (Npcf_PolicyAuthorization_Update response) from the PCF1, the NEF network element provides a feedback regarding an AF session update response to the AF network element, which may be an AF session update response (Nnef_AFsessionWithQoS_Update response) regarding the Qos policy.

In S1213, the PCF1 provides a feedback on a policy authorization notification to the NEF network element. For example, the PCF1 network element also provides a feedback on a policy authorization notification (Npcf_PolicyAuthorization_Notify) to the NEF network element, so as to notify the NEF network element of the authorization information regarding the policy.

In S1214, after receiving the policy authorization notification, the NEF network element provides a feedback on an AF session notification regarding the policy to the AF network element. For example, after the NEF network element receives the policy authorization notification (Npcf_PolicyAuthorization_Notify) from the PCF1, the NEF network element provides a feedback on the AF session notification regarding the policy to the AF network element, which may be an AF session notification (Nnef_AfsessionWithQoS_Notify) regarding the QoS policy.

According to the above implementation application, during the AF session update process, the policy required for the corresponding UE may be provided based on the AF session.

In the above embodiments provided in the present disclosure, the methods provided by the embodiments of the present disclosure are introduced from a perspective of the network device. In order to implement various functions of the methods provided in the embodiments of the present disclosure, the network device may include a hardware structure, a software module, and may be implement in form of the hardware structure, the software module or a combination of the hardware structure and the software module to achieve the above-mentioned functions. One of the above functions may be executed in the form of the hardware structure, the software module, or a combination of the hardware structure and the software module.

Figure 13:
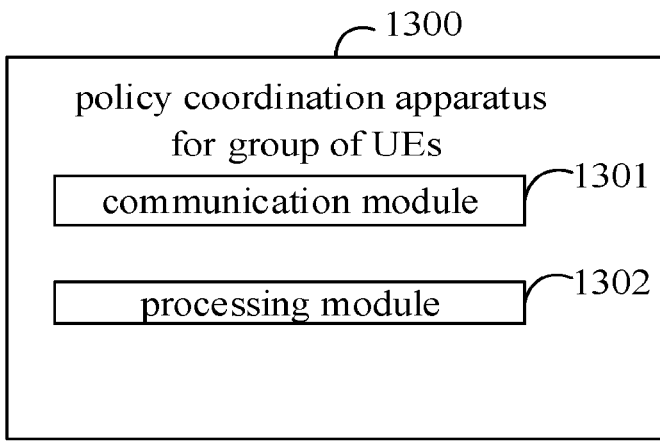
FIG. 13 is a structural diagram of a policy coordination apparatus for a group of UEs according to an embodiment of the present disclosure.
Figure 14:
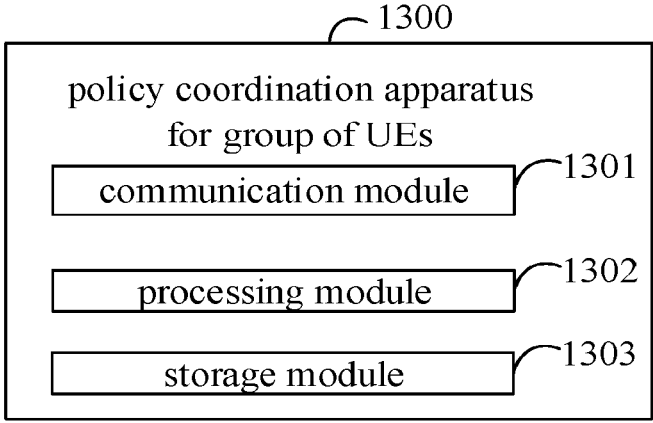
FIG. 14 is a structural diagram of a policy coordination apparatus for a group of UEs according to an embodiment of the present disclosure.
Figure 15:
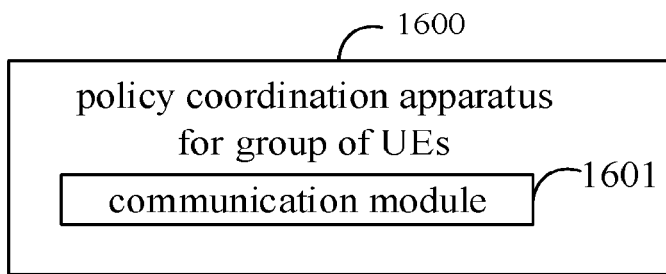
FIG. 15 is a structural diagram of a policy coordination apparatus for a group of UEs according to an embodiment of the present disclosure.

Correspondingly to the policy coordination methods provided for the group of user equipment UEs in the aforementioned embodiments, the present disclosure also provides a policy coordination apparatus for a group of user equipment UEs. Since the policy coordination apparatus for the group of user equipment UEs provided the embodiment of the present disclosure corresponds to the policy coordination method provided in the aforementioned embodiment for the group of user equipment UEs, implementation of the policy coordination method for the group of user equipment UEs is also applicable to the policy coordination apparatus for the group of user equipment UEs provided in the present embodiment, which will not be described in detail in the present embodiment. FIGS. 13 to 15 are structural diagrams of a policy coordination apparatus for a group of UEs provided according to the present disclosure.

FIG. 13 is a structural diagram of a policy coordination apparatus for a group of UEs according to an embodiment of the present disclosure. The apparatus is applied to a PCF network element. As shown in FIG. 13, the policy coordination apparatus 1300 for the group of UEs includes a communication module 1301, configured to receive a policy request, where the policy request is related to a group policy for the group of UEs, and a processing module 1302, configured to perform, according to the policy request and pre-stored group policy information, policy coordination on the group of UEs, where the pre-stored group policy information indicates a policy required to be adopted by each UE in the group of UEs for various group policies of the group of UEs.

In an embodiment of the present disclosure, by pre-storing the group policy information in the PCF network element, when the PCF network element receives the policy request, the PCF network element may perform the policy coordination on the group of UEs according to the policy request and the pre-stored group policy information, thereby ensuring policy synchronization among the AF sessions of the UEs.

One or a plurality of PCF network elements may be used to serve the group of UEs. For example, all UEs in the group of UEs may be served by one PCF network element, or each UE in the group of UEs may be served by different PCF network elements.

In some embodiments, when the PCF network element group only includes the PCF network element, the processing module 1302 is configured to determine a respective policy for each UE served by the PCF network element according to the policy request and the pre-stored group policy information.

In some embodiments, when the PCF network element group includes other PCF network element other than the PCF network element, the processing module 1302 is configured to determine a policy for a UE served by the PCF network element and determine a policy request for other UE in the group of UEs according to the policy request and the pre-stored group policy information, acquire respective identification information of the PCF network element serving the other UE; and respectively send, according to the respective identification information of the PCF network element serving the other UE, a policy request of a respective UE served by the PCF network element serving the other UE to the PCF network element serving the other UE, to indicate, according to the policy request of the UE served by the PCF element serving the other UE and the pre-stored group policy information, that the PCF network element serving the other UE respectively determines a policy for the respective UE served by the PCF element serving the other UE.

In some embodiments, when the PCF network element group includes other PCF network element other than the PCF network element, the processing module 1302 is configured to determine, according to the policy request and the pre-stored group policy information, a policy for a UE served by the PCF network element; acquire respective identification information of the PCF network element serving other UE in the group of the UEs; and respectively send, according to the respective identification information of the PCF network element serving the other UE, the policy request to the PCF network element serving the other UE, to indicate that the PCF network element serving the other UE respectively determines a policy request of a respective UE served by the PCF network element serving the other UE according to the policy request and determines a policy for the respective UE served by the PCF network element serving the other UE according to the policy request of the respective UE served by the PCF network element serving the other UE and the pre-stored group policy information.

In some embodiments, the communication module 1301 is also configured to receive a service request for the group of UEs from an application function AF network element served by any PCF network element in a PCF network element group for serving the group of UEs, where the service request includes group policy information for the group of UEs. The policy coordination apparatus 1300 for the group of UEs also includes a storage module 1303 configured to store group policy information, as shown in FIG. 14.

In some embodiments, the service request also includes a policy synchronization indication, when the PCF network element group includes other PCF network element other than PCF network element, the communication module 1301 is also configured to acquire respective identification information of the other PCF network element; and respectively send, according to the respective identification information of the other PCF network element, the group policy information to the other PCF network element, such that the other PCF network element stores the group policy information respectively.

In some embodiments, the communication module 1301 is also configured to receive group policy information for the group of UEs from another PCF network element other than the PCF network element, where the group policy information comes from a service request received by the another PCF network element from an AF network element served by the another PCF network element.

In some embodiments, the communication module 1301 is configured to receive the policy request from an AF network element served by the PCF network element or from another PCF network element in a PCF network element group other than the PCF network element.

FIG. 15 is a structural diagram of a policy coordination apparatus for a group of user equipment UEs according to an embodiment of the present disclosure. The apparatus is applied to an AF network element.

As shown in FIG. 15, the policy coordination apparatus 1600 for the group of UEs includes: a communication module 1601, configured to send a policy request to the PCF network element serving the AF network element, where the policy request is related to a group policy for a group of UEs and indicates the PCF network element to perform policy coordination on the group of UEs according to the policy request and pre-stored group policy information, where the pre-stored group policy information indicates a policy required to be adopted by each UE in the group of UEs for various group policies of the group of UEs.

In an embodiment of the present disclosure, the AF network element may send a policy request to the PCF network element serving the AF network element, and there is pre-stored group policy information in the PCF network element. Thus, when receiving the policy request, the PCF network element may perform the policy coordination on the group of UEs according to the policy request and the pre-stored group policy information, thereby ensuring policy synchronization among the AF sessions of the UEs.

In some embodiments, the communication module 1601 is also configured to send a service request for the group of UEs to the PCF network element serving the AF network element, where the service request includes group policy information for the group of UEs, such that the PCF network element stores the group policy information.

In some embodiments, the service request also includes a policy synchronization indication, the policy synchronization indication is used to indicate that the PCF network element respectively sends the group policy information to other PCF network element when a PCF network element group for serving the group of UEs includes the other PCF network element other than the PCF network element, such that the other PCF network element stores the group policy information respectively.

In some embodiments, the communication module 1601 is also configured to send a service request for the group of UEs to each PCF network element in a PCF network element group for serving the group of UEs, where the service request includes group policy information for the group of UEs, such that each PCF network element stores the group policy information respectively According to the embodiments of the present disclosure, the present disclosure also provides a communication device and a computer-readable storage medium.

Figure 16:
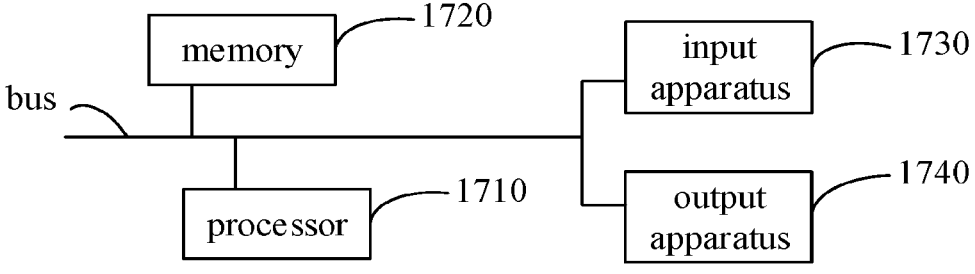
FIG. 16 is a structural diagram of a communication device according to an embodiment of the present disclosure.

As shown in FIG. 16, a block diagram of a communication device provided by an embodiment of the present disclosure is shown. The communication device is intended to represent various forms of digital computers, such as a laptop computer, a desktop computer, a workbench, a personal digital assistant, a server, a blade server, a mainframe computer, and other suitable computers. The communication device may also represent various forms of mobile devices, such as a personal digital assistant, a cell phone, a smart phone, a wearable device, and other similar computing devices. The components shown herein, the connections and relationships thereof, and the functions thereof are meant to be examples only, and are not intended to limit implementations of the present disclosure described and/or claimed herein.

As shown in FIG. 16, the communication device includes: one or more processors 1710, a memory 1720, and interfaces for connecting various components, including a high-speed interface and a low-speed interface. The various components are interconnected using different buses, and may be mounted on a common motherboard or in other manners as required. The processor can process instructions for execution within the communication device, including instructions stored in the memory or on the memory to display graphical information for a GUI on an external input/output apparatus (e.g., a display device coupled to an interface). In other embodiments, a plurality of processors and/or a plurality of buses may be used, if necessary, along with a plurality of memories. Also, a plurality of communication devices may be connected, with each device providing portions of the necessary operations (e.g., as a server array, a group of blade servers, or a multi-processor system). FIG. 16 takes a processor 1710 as an example.

The memory 1720 is a non-transitory computer readable storage medium provided by the present disclosure. The memory stores instructions executable by at least one processor, such that the at least one processor executes the policy coordination method provided by the present disclosure. The non-transitory computer readable storage medium of the present disclosure stores computer instructions. The computer instructions are used for causing a computer to execute the policy coordination method provided by the present disclosure.

As a non-transitory computer readable storage medium, the memory 1720 may be configured to store non-transitory software programs, non-transitory computer executable programs and modules, such as the program instructions/modules corresponding to the policy coordination method in some embodiments of the present disclosure. The processor 1710 runs non-transitory software programs, instructions and modules stored in the memory 1720, to execute various function applications of a server and data processing, i.e., implementing the policy coordination method in the above embodiments of the method.

The memory 1720 may include a program storage area and a data storage area, where the program storage area may store an operating system and applications required by at least one function; and the data storage area may store, e.g., data created based on use of the communication device. In addition, the memory 1720 may include a high-speed random access memory, and may further include a non-transitory memory, such as at least one magnetic disk storage component, a flash memory component, or other non-transitory solid-state storage components. Optionally, the memory 1720 may alternatively include memories disposed remotely relative to the processor 1710, and these remote memories may be connected to the communication device via a network. Examples of the above network include, but are not limited to, the Internet, an intranet, a local area network, a mobile communication network, and a combination thereof.

The communication device may further include: an input apparatus 1730 and an output apparatus 1740. The processor 1710, the memory 1720, the input apparatus 1730, and the output apparatus 1740 may be connected through a bus or in other manners. Bus connection is taken as an example in FIG. 16.

The input apparatus 1730 may receive inputted number or character information, and generate key signal input related to user settings and function control of the communication device, e.g. an input apparatus such as a touch screen, a keypad, a mouse, a trackpad, a touchpad, an indicating arm, one or more mouse buttons, a trackball, and a joystick. The output apparatus 1740 may include a display device, an auxiliary lighting apparatus (e.g. an LED), a haptic feedback apparatus (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an ASIC (application specific integrated circuit), computer hardware, firmware, software, and/or a combination thereof. The various embodiments may include: implementation in one or more computer programs that are executable and/or interpretable on a programmable system including at least one programmable processor, which may be special purpose or general purpose programmable processor, may receive data and instructions from, and to transmit data and instructions to, a storage system, at least one input apparatus, and at least one output apparatus.

These computer programs (also known as programs, software, software applications, or code) include machine instructions for a programmable processor, and may be implemented in a high-level procedural and/or object-oriented programming language, and/or in assembly/machine language. As used herein, the terms "machine readable medium" and "computer readable medium" refer to any computer program product, device, and/or apparatus (e.g. a magnetic disk, an optical disk, a memory, or a programmable logic device (PLD)) used to provide machine instructions and/or data to a programmable processor, and include a machine readable medium receiving a machine instruction as a machine readable signal. The term "machine readable signal" refers to any signal used to provide machine instructions and/or data to a programmable processor.

To provide interaction with a user, the systems and technologies described herein can be implemented on a computer that has: a display apparatus (e.g. a CRT (cathode ray tube) or a LCD (liquid crystal display) monitor) for displaying information to the user); and a keyboard and a pointing apparatus (e.g., a mouse or a trackball) through which the user can provide input to the computer. Other kinds of apparatus may also be used to provide interaction with the user. For example, the feedback provided to the user may be any form of sensory feedback (e.g., visual feedback, auditory feedback, or haptic feedback); and may receive input from the user in any form (including acoustic input, voice input, or tactile input).

The systems and technologies described herein may be implemented in a computing system that includes a back-end component (for example, as a data server), or a computing system that includes a middleware component (for example, an application server), or a computing system that includes a front-end component (for example, a user computer with a graphical user interface or a web browser through which the user can interact with an implementation of the systems and technologies described herein), or any combination of such back-end component, middleware component, or front-end component. The components of the system may be interconnected by any form or medium of digital data communication (e.g., a communication network). Examples of communication networks include a local area network (LAN), a wide area network (WAN), and the Internet.

The computer system may include clients and servers. A client and server are generally remote from each other and typically interact through a communication network. The relationship of client and server arises by virtue of computer programs running on corresponding computers and having a client-server relationship to each other.

A person skilled in the art may further understand that various illustrative logical blocks and steps that are listed in the present disclosure may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of present disclosure.

The present disclosure also provides a readable storage medium with instructions stored thereon, when the instructions are executed by a computer, a function of any one of the above methods of the embodiments is implemented.

The present disclosure also provides a computer program product, and when computer program product are executed by a computer, a function of any one of the above methods of the embodiments is implemented.

In the foregoing embodiments, it may be implemented in whole or in part by software, hardware, firmware, or any combination thereof. When implemented by software, it can be implemented in the form of a computer program product in whole or in part. The computer program product includes one or more computer programs. When the computer program is loaded and executed on the computer, the process or function according to the embodiment of the present disclosure is generated in whole or in part. The computer may be a general-purpose computer, a special-purpose computer, a computer network, or other programmable devices. The computer program may be stored in a non-transitory computer-readable storage medium, or transmitted from one computer-readable storage medium to another computer-readable storage medium. For example, the computer program may be downloaded from a website, computer, server, or data center. Transmission to another website, computer, server or data center via wired (such as coaxial cable, optical fiber, digital subscriber line (DSL)) or wireless (such as infrared, wireless, microwave, etc.). The non-transitory computer-readable storage medium may be any available medium that can be accessed by a computer or a data storage device such as a server or a data center integrated with one or more available media. The usable medium may be a magnetic medium (for example, a floppy disk, a hard disk, a magnetic tape), an optical medium (for example, a high-density digital video disc (digital video disc, DVD)), or a semiconductor medium (for example, a solid state disk (solid state disk, SSD)) etc.

Those skilled in the art can understand that the various digital numbers such as first and second involved in the present disclosure are only for easy distinction for description, and are not used to limit the scope of the embodiments of the present disclosure, but also indicate a sequence.

The term "at least one" in the present disclosure can also be described as one or more, and the "more" can be two, three, four or more, which is not limited in the present disclosure. In the embodiments of the present disclosure, for a technical feature, the technical feature is distinguished by "first", "second", "third", "A", "B", "C", and "D", etc. For the technical features in "first", "second", "third", "A", "B", "C" and "D", there is no order or size order among the technical features.

The corresponding relationships shown in the tables in the present disclosure can be configured or pre-defined. The value of the information in each table is only an example, and can be configured to other values, which is not limited in the present disclosure. When configuring the correspondence between the information and the parameters, it is not necessarily required to configure all the correspondences indicated in the tables. For example, in the table in the present disclosure, the corresponding relationship shown in some rows may not be configured. For another example, appropriate deformation adjustments can be made based on the above table, such as splitting, merging, and so on. The names of the parameters shown in the titles in the above tables may also adopt other names that can be understood by the communication device, and the values or expressions of the parameters may also be other values or expressions that can be understood by the communication device. When the above tables are implemented, other data structures can also be used, such as arrays, queues, containers, stacks, linear tables, pointers, linked lists, trees, graphs, structures, classes, heaps, hash tables, or hash tables.

The pre-definition in the present disclosure can be understood as definition, pre-definition, storage, pre-storage, pre-negotiation, pre-configuration, curing, or pre-fired.

Those skilled in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

The embodiments according to a first aspect of the present disclosure provide a policy coordination method for a group of user equipment UEs, applied to a policy control function (PCF) network element, the method includes: receiving a policy request, where the policy request is related to a group policy for the group of UEs; and performing, according to the policy request and pre-stored group policy information, policy coordination on the group of UEs, where the pre-stored group policy information indicates a policy required to be adopted by each UE in the group of UEs for various group policies of the group of UEs.

Optionally, when a PCF network element group for serving the group of UEs only includes the PCF network element, the performing the policy coordination on the group of UEs according to the policy request and the pre-stored group policy information includes: determining, according to the policy request and the pre-stored group policy information, a respective policy for each UE in the group of UEs.

Optionally, when a PCF network element group for serving the group of UEs includes other PCF network element other than the PCF network element, the performing the policy coordination on the group of UEs according to the policy request and the pre-stored group policy information includes: according to the policy request and the pre-stored group policy information, determining a policy for a UE served by the PCF network element and determining a policy request for other UE other than the UE served by the PCF network element in the group of UEs; acquiring respective identification information of the PCF network element serving the other UE; and respectively sending, according to the respective identification information of the PCF network element serving the other UE, a policy request of a respective UE served by the PCF network element serving the other UE to the PCF network element serving the other UE, to indicate, according to the policy request of the UE served by the PCF element serving the other UE and the pre-stored group policy information, that the PCF network element serving the other UE respectively determines a policy for the respective UE served by the PCF element serving the other UE.

Optionally, when a PCF network element group for serving the group of UEs includes other PCF network element other than the PCF network element, the performing the policy coordination on the group of UEs according to the policy request and the pre-stored group policy information includes: determining, according to the policy request and the pre-stored group policy information, a policy for a UE served by the PCF network element; acquiring respective identification information of the PCF network element serving other UE other than the UE served by the PCF network element in the group of the UEs; and respectively sending, according to the respective identification information of the PCF network element serving the other UE, the policy request to the PCF network element serving the other UE, to indicate that the PCF network element serving the other UE respectively determines a policy request of a respective UE served by the PCF network element serving the other UE according to the policy request and determines a policy for the respective UE served by the PCF network element serving the other UE according to the policy request of the respective UE served by the PCF network element serving the other UE and the pre-stored group policy information.

Optionally, the method further includes: receiving a service request for the group of UEs from an application function AF network element served by any PCF network element in a PCF network element group for serving the group of UEs, where the service request includes group policy information for the group of UEs; and storing the group policy information.

Optionally, the service request further includes a policy synchronization indication, when the PCF network element group includes other PCF network element other than the PCF network element, the method further includes: acquiring respective identification information of the other PCF network element; and respectively sending, according to the respective identification information of the other PCF network element, the group policy information to the other PCF network element, such that the other PCF network element stores the group policy information respectively.

Optionally, where when a PCF network element group for serving the group of UEs includes other PCF network element other than the PCF network element, the method further includes: receiving group policy information for the group of UEs from another PCF network element other than the PCF network element, where the group policy information comes from a service request received by the another PCF network element from an AF network element served by the another PCF network element; and storing the group policy information.

Optionally, the receiving the policy request includes: receiving the policy request from an AF network element served by the PCF network element; or receiving the policy request from another PCF network element, other than the PCF network element, in a PCF network element group for serving the group of UEs.

The embodiments according to a second aspect of the present disclosure provide a policy coordination method for a group of user equipment UEs, applied to an application function (AF) network element, the method includes: sending a policy request to a policy control function PCF network element serving the AF network element, where the policy request is related to a group policy for the group of UEs and indicates the PCF network element to perform policy coordination on the group of UEs according to the policy request and pre-stored group policy information, where the pre-stored group policy information indicates a policy required to be adopted by each UE in the group of UEs for various group policies of the group of UEs.

Optionally, the method further includes: sending a service request for the group of UEs to the PCF network element serving the AF network element, where the service request includes group policy information for the group of UEs, such that the PCF network element stores the group policy information.

Optionally, the service request further includes a policy synchronization indication, the policy synchronization indication is used to indicate that the PCF network element respectively sends the group policy information to other PCF network element when a PCF network element group for serving the group of UEs includes the other PCF network element other than the PCF network element, such that the other PCF network element stores the group policy information respectively.

Optionally, the method further includes: sending a service request for the group of UEs to each PCF network element in a PCF network element group for serving the group of UEs, where the service request includes group policy information for the group of UEs, such that each PCF network element stores the group policy information respectively.

The embodiments according to a third aspect of the present disclosure provide a policy coordination apparatus for a group of user equipment UEs, applied to a policy control function PCF network element, the apparatus includes: a communication module, configured to receive a policy request, where the policy request is related to a group policy for the group of UEs; and a processing module, configured to perform, according to the policy request and pre-stored group policy information, policy coordination on the group of UEs, where the pre-stored group policy information indicates a policy required to be adopted by each UE in the group of UEs for various group policies of the group of UEs.

Optionally, when the PCF network element group only includes the PCF network element, the processing module is configured to determine a respective policy for each UE served by the PCF network element according to the policy request and the pre-stored group policy information.

Optionally, when the PCF network element group includes other PCF network element other than the PCF network element, the processing module is configured to determine a policy for a UE served by the PCF network element and determine a policy request for other UE in the group of UEs according to the policy request and the pre-stored group policy information, acquire respective identification information of the PCF network element serving the other UE; and respectively send, according to the respective identification information of the PCF network element serving the other UE, a policy request of a respective UE served by the PCF network element serving the other UE to the PCF network element serving the other UE, to indicate, according to the policy request of the UE served by the PCF element serving the other UE and the pre-stored group policy information, that the PCF network element serving the other UE respectively determines a policy for the respective UE served by the PCF element serving the other UE.

Optionally, when the PCF network element group includes other PCF network element other than the PCF network element, the processing module is configured to determine, according to the policy request and the pre-stored group policy information, a policy for a UE served by the PCF network element; acquire respective identification information of the PCF network element serving other UE in the group of the UEs; and respectively send, according to the respective identification information of the PCF network element serving the other UE, the policy request to the PCF network element serving the other UE, to indicate that the PCF network element serving the other UE respectively determines a policy request of a respective UE served by the PCF network element serving the other UE according to the policy request and determines a policy for the respective UE served by the PCF network element serving the other UE according to the policy request of the respective UE served by the PCF network element serving the other UE and the pre-stored group policy information.

Optionally, the communication module is also configured to receive a service request for the group of UEs from an application function AF network element served by any PCF network element in a PCF network element group for serving the group of UEs, where the service request includes group policy information for the group of UEs; and the apparatus also includes a storage module configured to store group policy information.

Optionally, the service request also includes a policy synchronization indication, when the PCF network element group includes other PCF network element other than PCF network element, the communication module is also configured to acquire respective identification information of the other PCF network element; and respectively send, according to the respective identification information of the other PCF network element, the group policy information to the other PCF network element, such that the other PCF network element stores the group policy information respectively.

Optionally, the communication module is also configured to receive group policy information for the group of UEs from another PCF network element other than the PCF network element, where the group policy information comes from a service request received by the another PCF network element from an AF network element served by the another PCF network element; and the apparatus also includes a storage module configured to store group policy information.

Optionally, the communication module is configured to receive the policy request from an AF network element served by the PCF network element or from another PCF network element in a PCF network element group other than the PCF network element.

The embodiments according to a fourth aspect of the present disclosure provide a policy coordination apparatus for a group of user equipment UEs, applied to an AF network element, the apparatus includes: a communication module configured to send a policy request to the policy control function PCF network element serving the AF network element, where the policy request is related to a group policy for a group of UEs and indicates the PCF network element to perform policy coordination on the group of UEs according to the policy request and pre-stored group policy information, where the pre-stored group policy information indicates a policy required to be adopted by each UE in the group of UEs for various group policies of the group of UEs.

Optionally, the communication module is also configured to send a service request for the group of UEs to the PCF network element serving the AF network element, where the service request includes group policy information for the group of UEs, such that the PCF network element stores the group policy information.

Optionally, the service request also includes a policy synchronization indication, the policy synchronization indication is used to indicate that the PCF network element respectively sends the group policy information to other PCF network element when a PCF network element group for serving the group of UEs includes the other PCF network element other than the PCF network element, such that the other PCF network element stores the group policy information respectively.

Optionally, the communication module is also configured to send a service request for the group of UEs to each PCF network element in a PCF network element group for serving the group of UEs, where the service request includes group policy information for the group of UEs, such that each PCF network element stores the group policy information respectively The embodiments according to a fifth aspect of the present disclosure provide a communication device, including: a transceiver; a memory; a processor, connected to the transceiver and the memory respectively, configured to execute computer-executable instructions stored on the memory, such that the policy coordination method for a group of user equipment UEs according to any one of the above embodiments of the first aspect and the second aspect is implemented.

The embodiments according to a sixth aspect of the present disclosure provide a communication device a computer storage medium storing computer-executable instructions, which when the computer-executable instructions are executed, the policy coordination method for a group of user equipment UEs according to any one of the above embodiments of the first aspect and the second aspect is implemented.

According to the policy coordination method and the policy coordination apparatus for the group of user equipment UEs provided in the embodiments of the present disclosure, the group policy information is pre-stored in the PCF network element serving the group of UEs, such that when the PCF network element receives the policy request, the PCF network element may perform the policy coordination on the group of UEs according to the policy request and the pre-stored group policy information.

Those skilled in the art can clearly understand that, for the convenience and conciseness of description, the specific working process of the above-described system, device, and unit can refer to the corresponding process in the foregoing method embodiment, which will not be repeated here.

The above are only specific implementations of the present disclosure, but the protection scope of the present disclosure is not limited to this. Any person skilled in the art can easily think of changes or substitutions within the technical scope disclosed in the present disclosure, which should be covered within the scope of protection of the present disclosure. Therefore, the protection scope of the present disclosure should be subject to the protection scope of the claims.

What is claimed is:

1. A policy coordination method for a group of user equipment (UEs), applied to a policy control function (PCF) network element, comprising:

receiving a first policy request, wherein the first policy request is related to a group policy for the group of UEs; and performing, according to the first policy request and pre-stored group policy information, policy coordination on the group of UEs, wherein the pre-stored group policy information indicates a policy required to be adopted by each UE in the group of UEs for various group policies of the group of UEs;

wherein in case that a PCF network element group for serving the group of UEs comprises other PCF network element other than the PCF network element, the performing the policy coordination on the group of UEs according to the first policy request and the pre-stored group policy information comprises:

according to the first policy request and the pre-stored group policy information, determining a policy for a UE served by the PCF network element and determining a policy request for other UE other than the UE served by the PCF network element in the group of UEs;

acquiring identification information of the other PCF network element serving the other UE; and respectively sending, according to the identification information of the other PCF network element, the policy request of the other UE served by the other PCF network element to the other PCF network element, and indicating, according to the policy request of the other UE and the pre-stored group policy information, that the other PCF network element respectively determines a policy for the other UE; or determining, according to the first policy request and the pre-stored group policy information, a policy for a UE served by the PCF network element;

acquiring identification information of the other PCF network element serving other UE other than the UE served by the PCF network element in the group of the UEs; and respectively sending, according to the identification information of the other PCF network element, the first policy request to the other PCF network element, and indicating that the other PCF network element respectively determines a policy request of the other UE served by the other PCF network element according to the first policy request and determines a policy for the other UE according to the policy request of the other UE and the pre-stored group policy information.

2. The method according to claim 1, wherein in case that a PCF network element group for serving the group of UEs only comprises the PCF network element, the performing the policy coordination on the group of UEs according to the first policy request and the pre-stored group policy information comprises:

determining, according to the first policy request and the pre-stored group policy information, a policy for each UE in the group of UEs.

3. The method according to claim 1, further comprising:

receiving a service request for the group of UEs from an application function (AF) network element served by any PCF network element in a PCF network element group for serving the group of UEs, wherein the service request comprises group policy information for the group of UEs; and storing the group policy information.

4. The method according to claim 3, wherein the service request further comprises a policy synchronization indication, in case that the PCF network element group comprises other PCF network element other than the PCF network element, the method further comprises:

acquiring identification information of the other PCF network element; and respectively sending, according to the identification information of the other PCF network element, the group policy information to the other PCF network element, such that the other PCF network element stores the group policy information respectively.

5. The method according to claim 1, wherein in case that a PCF network element group for serving the group of UEs comprises other PCF network element other than the PCF network element, the method further comprises:

receiving group policy information for the group of UEs from another PCF network element other than the PCF network element, wherein the group policy information comes from a service request received by the another PCF network element from an application function (AF) network element served by the another PCF network element; and storing the group policy information.

6. The method according to claim 1, wherein the receiving the first policy request comprises:

receiving the first policy request from an application function (AF) network element served by the PCF network element; or receiving the first policy request from another PCF network element, other than the PCF network element, in a PCF network element group for serving the group of UEs.

7. A policy coordination method for a group of user equipment (UEs), applied to an application function (AF) network element, comprising:

sending a first policy request to a policy control function (PCF) network element serving the AF network element, wherein the first policy request is related to a group policy for the group of UEs and indicates the PCF network element to perform policy coordination on the group of UEs according to the first policy request and pre-stored group policy information, wherein the pre-stored group policy information indicates a policy required to be adopted by each UE in the group of UEs for various group policies of the group of UEs;

wherein in case that a PCF network element group for serving the group of UEs comprises other PCF network element other than the PCF network element, the PCF network element performing the policy coordination on the group of UEs according to the first policy request and the pre-stored group policy information comprises:

according to the first policy request and the pre-stored group policy information, the PCF network element determining a policy for a UE served by the PCF network element and determining a policy request for other UE other than the UE served by the PCF network element in the group of UEs;

the PCF network element acquiring identification information of the other PCF network element serving the other UE; and the PCF network element respectively sending, according to the identification information of the other PCF network element, the policy request of the other UE served by the other PCF network element to the other PCF network element, and indicating, according to the policy request of the other UE and the pre-stored group policy information, that the other PCF network element respectively determines a policy for the other UE; or the PCF network element determining, according to the first policy request and the pre-stored group policy information, a policy for a UE served by the PCF network element;

the PCF network element acquiring identification information of the other PCF network element serving other UE other than the UE served by the PCF network element in the group of the UEs; and the PCF network element respectively sending, according to the identification information of the other PCF network element, the first policy request to the other PCF network element, and indicating that the other PCF network element respectively determines a policy request of the other UE served by the other PCF network element according to the first policy request and determines a policy for the other UE according to the policy request of the other UE and the pre-stored group policy information.

8. The method according to claim 7, further comprising:

sending a service request for the group of UEs to the PCF network element serving the AF network element, wherein the service request comprises group policy information for the group of UEs, such that the PCF network element stores the group policy information.

9. The method according to claim 8, wherein the service request further comprises a policy synchronization indication, the policy synchronization indication is used to indicate that the PCF network element respectively sends the group policy information to other PCF network element in case that a PCF network element group for serving the group of UEs comprises the other PCF network element other than the PCF network element, such that the other PCF network element stores the group policy information respectively.

10. The method according to claim 7, further comprising:

sending a service request for the group of UEs to each PCF network element in a PCF network element group for serving the group of UEs, wherein the service request comprises group policy information for the group of UEs, such that each PCF network element stores the group policy information respectively.

11. A communication device, comprising:

a transceiver;

a memory for storing computer-executable instructions;

a processor, connected to the transceiver and the memory respectively, when running the computer-executable instructions, the processor is configured to implement the method according to claim 7.

12. A communication device, comprising:

a transceiver;

a memory for storing computer-executable instructions;

a processor, connected to the transceiver and the memory respectively, when running the computer-executable instructions, the processor is configured to:

receive a first policy request, wherein the first policy request is related to a group policy for a group of user equipment (UEs); and perform, according to the first policy request and pre-stored group policy information, policy coordination on the group of UEs, wherein the pre-stored group policy information indicates a policy required to be adopted by each UE in the group of UEs for various group policies of the group of UEs;

wherein in case that a policy control function (PCF) network element group for serving the group of UEs comprises other PCF network element other than a PCF network element, the processor is configured to:

according to the first policy request and the pre-stored group policy information, determine a policy for a UE served by the PCF network element and determine a policy request for other UE other than the UE served by the PCF network element in the group of UEs;

acquire identification information of the other PCF network element serving the other UE; and respectively send, according to the identification information of the other PCF network element, the policy request of the other UE served by the other PCF network element to the other PCF network element, and indicate, according to the policy request of the other UE and the pre-stored group policy information, that the other PCF network element respectively determines a policy for the other UE; or determine, according to the first policy request and the pre-stored group policy information, a policy for a UE served by the PCF network element;

acquire identification information of the other PCF network element serving other UE other than the UE served by the PCF network element in the group of the UEs; and respectively send, according to the identification information of the other PCF network element, the first policy request to the other PCF network element, and indicate that the other PCF network element respectively determines a policy request of the other UE served by the other PCF network element according to the first policy request and determines a policy for the other UE according to the policy request of the other UE and the pre-stored group policy information.

13. The communication device according to claim 12, wherein in case that a policy control function (PCF) network element group for serving the group of UEs only comprises a PCF network element, the processor is configured to:

determine, according to the first policy request and the pre-stored group policy information, a policy for each UE in the group of UEs.

14. The communication device according to claim 12, wherein the processor is further configured to:

receive a service request for the group of UEs from an application function (AF) network element served by any policy control function (PCF) network element in a PCF network element group for serving the group of UEs, wherein the service request comprises group policy information for the group of UEs; and store the group policy information.

15. The communication device according to claim 14, wherein the service request further comprises a policy synchronization indication, in case that the PCF network element group comprises other PCF network element other than a PCF network element, the processor is configured to:

acquire identification information of the other PCF network element; and respectively send, according to the identification information of the other PCF network element, the group policy information to the other PCF network element, such that the other PCF network element stores the group policy information respectively.

16. The communication device according to claim 12, wherein in case that a policy control function (PCF) network element group for serving the group of UEs comprises other PCF network element other than a PCF network element, the processor is configured to:

receive group policy information for the group of UEs from another PCF network element other than the PCF network element, wherein the group policy information comes from a service request received by the another PCF network element from an application function (AF) network element served by the another PCF network element; and store the group policy information.

* * * * *